(12) United States Patent
Thomas

(10) Patent No.: US 8,606,834 B2
(45) Date of Patent: Dec. 10, 2013

(54) MANAGING SUPPLIED DATA

(75) Inventor: Kasman E. Thomas, Wilton, CT (US)

(73) Assignee: Apple Inc., Cupertino, CA (US)

( * ) Notice: Subject to any disclaimer, the term of this patent is extended or adjusted under 35 U.S.C. 154(b) by 2027 days.

(21) Appl. No.: 11/505,134

(22) Filed: Aug. 16, 2006

(65) Prior Publication Data

US 2008/0046216 A1 Feb. 21, 2008

(51) Int. Cl.
*G06F 1/02* (2006.01)

(52) U.S. Cl.
USPC .......................................... 708/250; 702/179

(58) Field of Classification Search
USPC .................................................. 708/250–256
See application file for complete search history.

(56) References Cited

U.S. PATENT DOCUMENTS

| | | | |
|---|---|---|---|
| 5,710,834 A * | 1/1998 | Rhoads | 382/232 |
| 5,971,850 A | 10/1999 | Liverance | |
| 6,128,613 A * | 10/2000 | Wong et al. | 707/738 |
| 6,320,966 B1 | 11/2001 | Brands | |
| 6,910,057 B2 * | 6/2005 | Shackleford et al. | 708/250 |
| 7,664,269 B2 * | 2/2010 | Wood et al. | 380/284 |
| 2004/0019798 A1 | 1/2004 | Ishii | |
| 2004/0102242 A1 * | 5/2004 | Poelmann | 463/22 |
| 2004/0141611 A1 * | 7/2004 | Szrek et al. | 380/28 |
| 2005/0071741 A1 * | 3/2005 | Acharya et al. | 715/500 |
| 2006/0020647 A1 * | 1/2006 | Simon et al. | 708/250 |
| 2006/0072747 A1 | 4/2006 | Wood et al. | |
| 2006/0212441 A1 * | 9/2006 | Tang et al. | 707/5 |

OTHER PUBLICATIONS

Author: Kelsey et al.; Title: Yarrow-160: Notes on the Design and Analysis of the Yarrow Cryptographic Pseudorandom Number Generator; Date: 1999; URL: http://www.schneier.com/paper-yarrow.html.*
Author: Hars; Title: Random Topics; Date: Jun. 13, 2004; URL: http://www.hars.us/Papers/RandomTopics-SummerCon.ppt.*
Author: Anonymous; Title: Cyrptographic Random Number Generators; Date: Jul. 28, 2002; URL: http://www.phrack.com/issues.html?issue=59&id=15.*
Holschuh et al.; Title: "Package: mg-tools"; Date: May 12, 2005; URL: http://packages.debian.org/sid/rng-tools; Date URL: http://packages.debian.org/changelogs/pool/main/r/rng-tools/rng-tools_2-unofficial-mt.13-3/changelog.*
Yuval Peres, "Iterating Von Neumann's Procedure for Extracting Random Bits," Annals of Statistics, vol. 20, Issue 1 (Mar. 1992), 590-597.

* cited by examiner

*Primary Examiner* — Michael D Yaary
(74) *Attorney, Agent, or Firm* — Womble Carlyle Sandridge & Rice LLP

(57) ABSTRACT

In a computing system environment, a data recipient manages entropy data supplied from an external data source despite not knowing or being certain about their trustworthiness or if such varies over time. Features relate to scoring the data and determining whether it meets or exceeds a predetermined policy score. One or more initial or updated reputation values of the data source are contemplated and used for scoring. Logging of the scoring, reputation values or other matters is provided for historical purposes and to identify possible future corrective actions. Other embodiments contemplate enhancing the score of the entropy data. In some instances, use of less than all the data by the recipient occurs to increase attack-resistance. Whether such occurs or how much occurs remains substantially unbeknownst to all parties other than the data recipient. Still other embodiments contemplate computer-readable media.

25 Claims, 12 Drawing Sheets

| 98 | 100 | 102 | 104 | 106 | 108 | 110 | 112 | 114 | 116 | 118 |
|---|---|---|---|---|---|---|---|---|---|---|
| Source | Reputation Value | Date | Type Supplied | Amount Supplied | Score | Score Technique | Score Meet/Exceed Technique | Data Enhanced | Enhanced Score | Enhancement Technique |
| Name | ... | dd/mm/yy | Burst or Periodic | Amount | 0 → 1 | Name | Y or N | Y or N | 0 → 1 | Name |

Fig. 9

MANAGING SUPPLIED DATA

FIELD OF THE INVENTION

Generally, the present invention relates to computing system environments involved in transmitting or receiving entropy data, such as random numbers. Particularly, it relates to a recipient's management of the supplied data, especially in instances when the source's trustworthiness is unknown, uncertain or varies with time. Various features relate to assessment of the data through testing and scoring. Reputation of the source is also considered as are certain logging functions. Resistance to attack is another noteworthy aspect.

BACKGROUND OF THE INVENTION

Entities involved in cryptography, science and research, security, military, communications and gaming industry applications, to name a few, all have present and growing needs for "entropy data," such as random numbers. Because of severe computing restrictions, small size, limited power, limited bandwidth, limited finances, etc., some entities are unable to internally generate a sufficient quality or quantity of random numbers and are increasingly becoming forced to obtain high-quality and quantity entropy bits externally. With this in mind, it has been fairly suggested that "entropy vending" and "entropy server" architectures will become commonplace whereby data sources external to data recipients will supply the data recipients with entropy data.

As a practical matter, however, it is well known that obtaining truly random numbers for the above-mentioned and other applications is exceptionally difficult. Also, a problem exists regarding establishing confidence in external data sources when their trustworthiness is unknown, cannot be ascertained with certainty, or changes over time. Trustworthiness is relevant in that an attacker could gain access to the source in an attempt to manipulate entropy traffic for nefarious or corrupt purposes. It is also relevant in that the source may be inherently dishonest or incompetent, either at the outset or at some point in the future.

Regardless, it is essential that a recipient of vended (externally supplied) entropy data have some method of dealing with data-quality uncertainties. Such methods should also have a sound information-theoretic basis; allow for the use of policy around the dispositioning of entropy data; allow for logging or monitoring of entropy-related events for historical or future corrective-action reasons; be safe against attack; and be applicable to multi-source as well as single-source scenarios. Naturally, any improvements should further contemplate good engineering practices, such as relative inexpensiveness, stability, ease of implementation, low complexity, etc.

SUMMARY OF THE INVENTION

The above-mentioned and other problems become solved by applying the principles and teachings associated with the hereinafter-described managing supplied data. Techniques for the characterization and disposition of entropy on the basis of source reputation are described. The invention also shows an approach to maintaining the ongoing information-theoretic soundness of an entropy pool built from imported entropy, even when the reputation of the provider is unknown, uncertain or varies over time. Attack-resistance features are also described.

In one aspect, a computing system environment contemplates one or more data sources supplying entropy or other data to a recipient. Internal to the recipient, and preferably only known by the recipient, management of the data includes, but is not limited to: testing and scoring of the data; developing initial and subsequent reputation values of the source; logging functions for historical or future corrective-action reasons; and enhancing functions for improving data scoring. At a basic level, a data source supplies entropy data to a recipient where it is buffered. Thereafter, it is assessed to determine whether it meets or exceeds a predetermined policy score. If it meets or exceeds the predetermined score, it is used for its intended purpose. If not, it is rejected and certain options for proceeding are given. In one option, enhancing the data score is attempted so that it passes the minimum scoring test. In this regard, random selection of the data occurs so that use of less than all the data occurs during intended applications. In turn, whether such occurs at all or to what extent remains substantially unbeknownst to all parties other than the data recipient. In this manner, attack-resistance is increased. Initial or updated reputation values of the data source are also contemplated and may be used for scoring. Logging of the scoring, reputation values or other matters is provided for historical purposes and to identify possible future corrective actions. Still other embodiments contemplate computer-readable media for doing some or all of the foregoing.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 9 and 10 are diagrammatic views in accordance with the present invention of representative logs for use with the logging function;

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for managing entropy data supplied from a data source are hereinafter described.

Preliminarily, "entropy data" roughly means data that which is either asserted (by a provider or data source), or assumed, not unreasonably, to be "truly random" in the sense of being: (1) non-deterministic in origin; (2) unpredictable as to content; or (3) compliant with some particular expectation of randomness beyond (1) or (2). In the real world, data that meets this description might, for example, be derived from observation of radioactive decay, such as from observing the time interval between two successive emissions from a beta emitter, e.g., phosphorous 32. In today's applications, numbers from random number generators (RNG), pseudo-random number generators (PRNG) or cryptographically secure pseudo-random number generators (CSPRNG) also sometimes fit the bill of random number data for most usages of entropy data. Of course, skilled artisans can contemplate other examples and such may be found in security protocols, such as SSL, that rely on RNG's, PRNG's and/or CSPRNG's, for example, to provide their protocol with an unpredictable nature.

Figure 1:
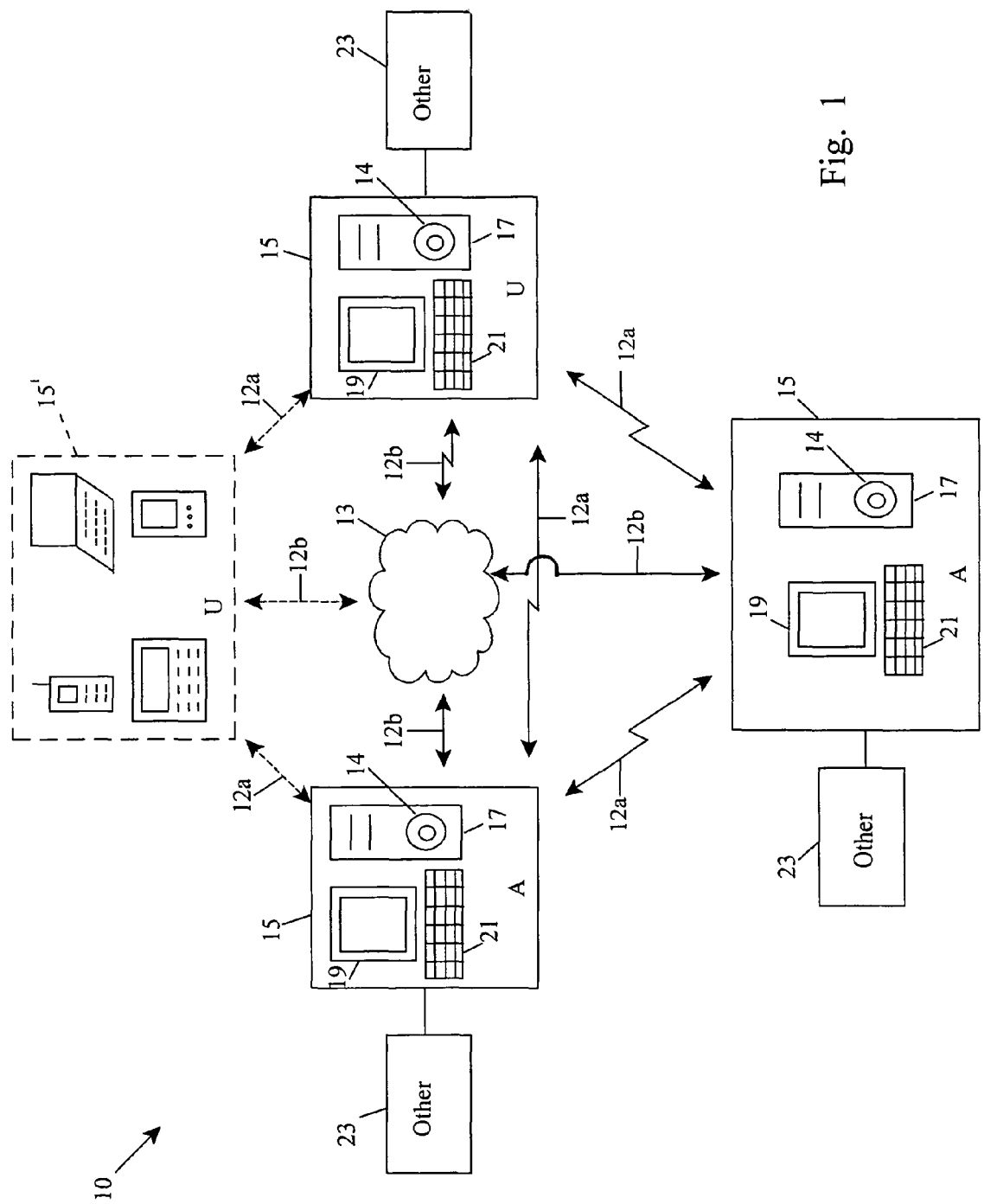
FIG. 1 is a diagrammatic view in accordance with the present invention of a representative computing system environment for managing supplied data.

With reference to FIG. 1, a representative environment 10 for managing supplied data includes one or more computing devices 15 available per each of a data source and recipient. In a traditional sense, an exemplary computing device exemplifies a stand alone server 17, such as grid or blade server. Alternatively, an exemplary computing device includes a general or special purpose computing device in the form of a conventional fixed or mobile computer 17 having an attendant monitor 19 and user interface 21. The computer internally includes a processing unit for a resident operating system, such as DOS, WINDOWS, MACINTOSH, UNIX and LINUX, to name a few, a memory, and a bus that couples various internal and external units, e.g., other 23, to one another. Representative other items 23 (also available per each of the data source or recipient) include, but are not limited to, PDA's, cameras, scanners, printers, microphones, joy sticks, game pads, satellite dishes, hand-held devices, consumer electronics, minicomputers, computer clusters, main frame computers, a message queue, a peer machine, a broadcast antenna, a web server, an AJAX client, a grid-computing node, a peer, a virtual machine, a web service endpoint, a detachable or fixed hardware device (such as a USB dongle), an audio or video port from which noise can be sampled, a cellular phone or palm device, other device(s) capable of emitting entropy, or the like. The other items may also be stand alone computing devices 15' in the environment 10.

In either, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., software, as part of computer readable media, e.g., disk 14 for insertion in a drive of computer 17. Computer executable instructions may also reside in hardware, firmware or combinations in any or all of the depicted devices 15 or 15'.

When described in the context of computer readable media, it is denoted that items thereof, such as modules, routines, programs, objects, components, data structures, etc., perform particular tasks or implement particular abstract data types within various structures of the computing system which cause a certain function or group of functions. In form, the computer readable media can be any available media, such as RAM, ROM, EEPROM, CD-ROM, DVD, or other optical disk storage devices, magnetic disk storage devices, floppy disks, or any other medium which can be used to store the items thereof and which can be assessed in the environment.

In network, the computing devices communicate with one another via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given nebulously as element 13. In this regard, other contemplated items include servers, routers, peer devices, modems, T1 lines, satellites, microwave relays or the like. The connections may also be local area networks (LAN) and/or wide area networks (WAN) that are presented by way of example and not limitation. The topology is also any of a variety, such as ring, star, bridged, cascaded, meshed, or other known or hereinafter invented arrangement.

Figure 2:
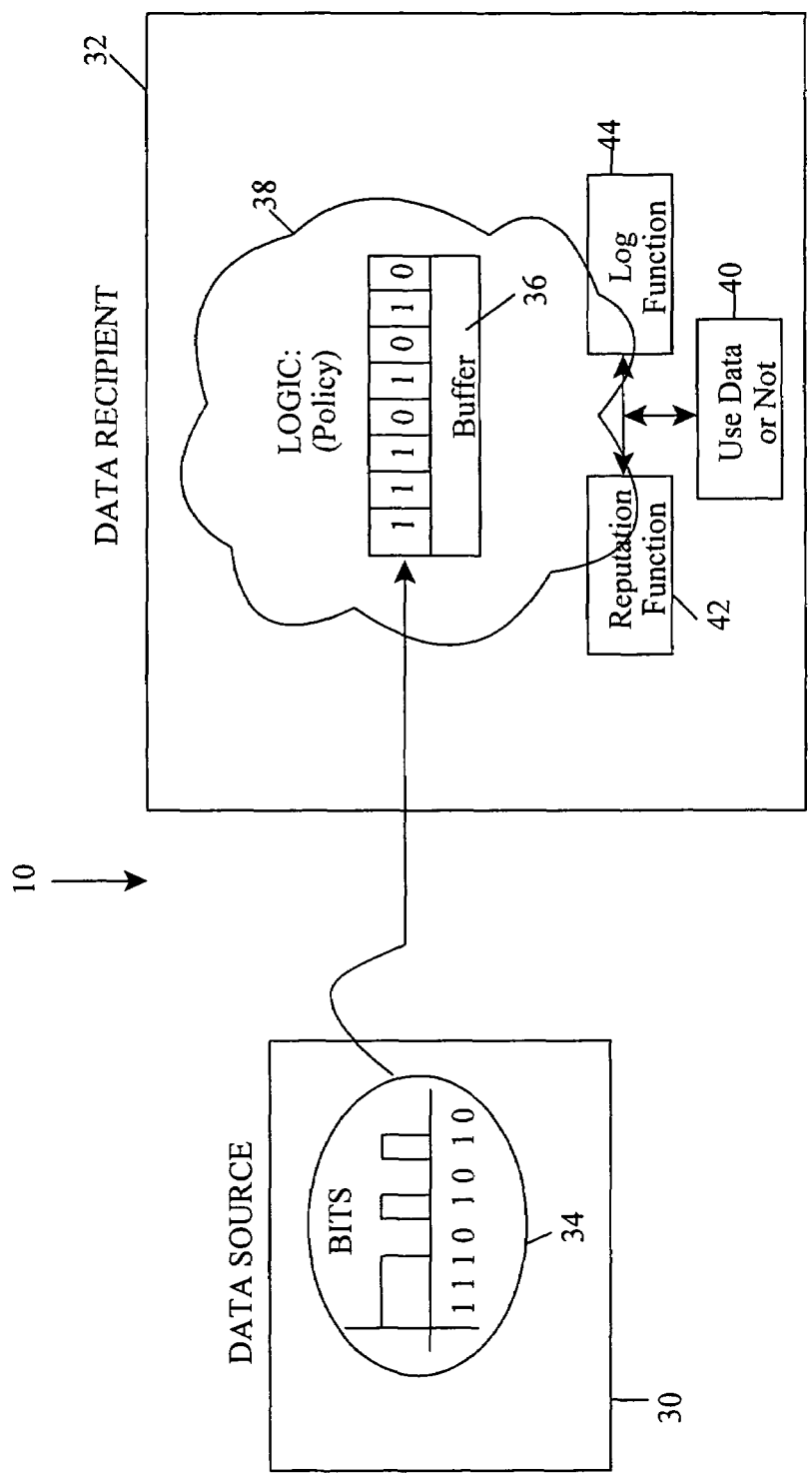
FIG. 2 is a diagrammatic view in accordance with the present invention of a representative data source supplying data to a data recipient and the recipient's management thereof.

With reference to FIG. 2, a data source and data recipient in the environment 10 are given as 30 and 32, respectively. Entropy data 34, here in the form of random bits having a sequence of 11101010, is supplied from the data source 30 to the data recipient 32. Upon its receipt, the recipient captures or buffers the data 36, applies internal logic 38 (preferably only known by the recipient and/or trusted third parties) and determines whether it will use the data or not 40 for an intended function or purpose. In this regard, various reputation functions 42 and/or logging functions 44, as part of the internal logic or not, are contemplated. Among other things, the functions derive, assess, update, and track the reputation of the data source from current and historical perspectives so that two parties can exchange entropy data, in real time or over time, without otherwise having known, certain or steadfast trust in one other. The logic also represents the interjection of policy in ascertaining how or if the data will be used. Altogether, the individual and combined functionality of logging, reputation and policy-based logic means that security by the recipient gains a new governance dimension, as will become clear below. Stated differently, the following represents embodiments of the general pattern of: examining incoming data to determine its adequacy for an intended purpose; rate the adequacy; update the source's reputation based on the adequacy; track the source's reputation over time; and apply policy that takes these items into account when deciding what to do with the data. It is also performed, as will be seen, in a manner that is especially resistant to compromise.

Figure 3:
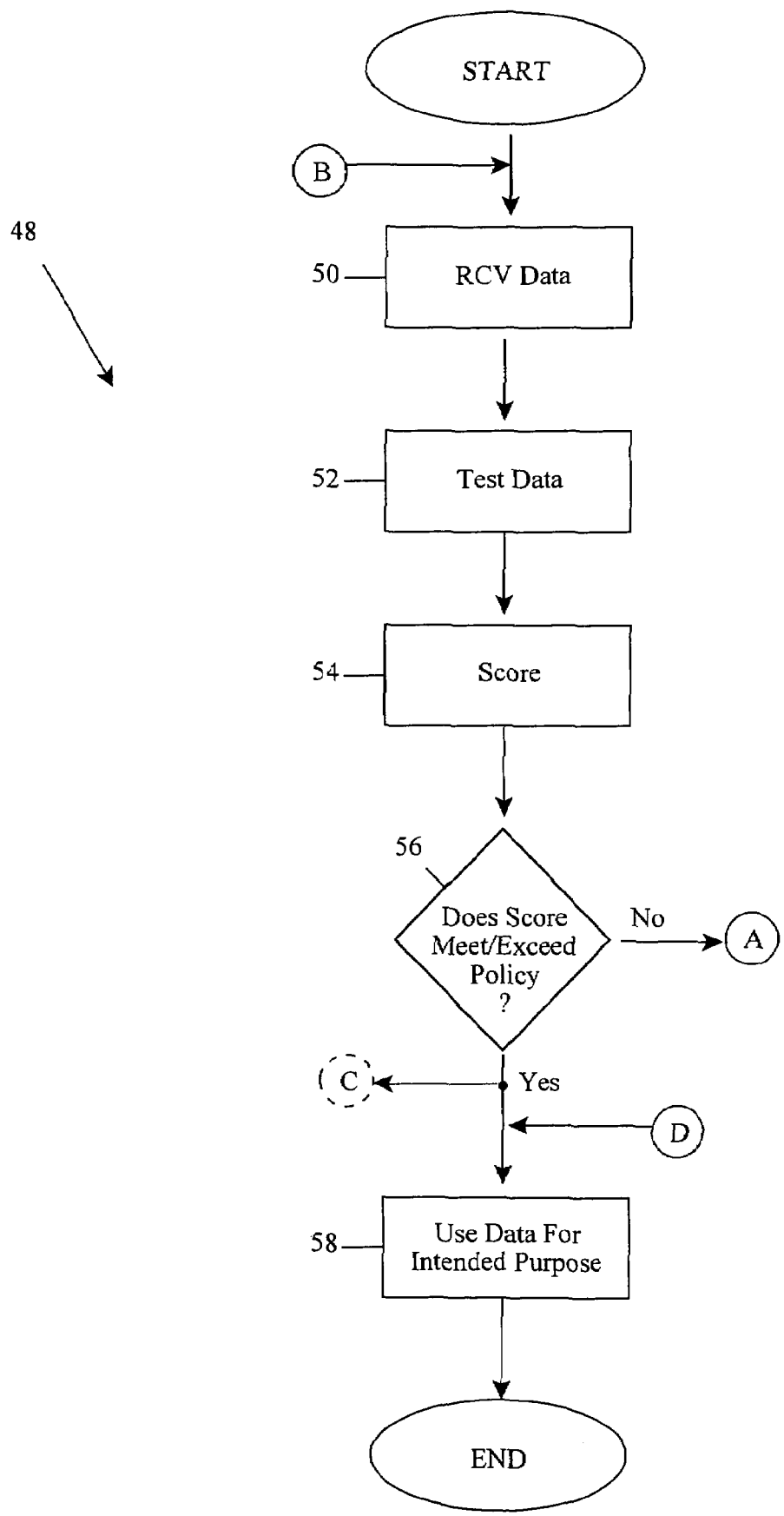
FIG. 3 is a flow chart in accordance with the present invention for managing supplied data.

With further detail, FIG. 3 is a flow chart 48 representing how the data recipient determines whether or not it will use the data. At step 50, the recipient receives the data from the data source. Per an agreement, the data is either: pushed from the source upon its own initiative to the recipient; requested by the recipient and sent from the source thereafter; offered by the source, accepted by the recipient, and thereafter sent; etc. and the act of receiving is either a burst of bits as seen in FIG. 2 or bits supplied over time. It may also be that the bits are grouped in large packages, arrive as contiguous or broken packages, represent single or multiple bursts, represent random bursts, represent encrypted data, or other. The data may also be from a single or multiple sources. To the extent multiple different sources are supplying data, it is contemplated that dedicated and/or isolated channels (not shown) are provided per each source. In this manner, the data amongst differing sources will not be contaminated with data from other sources. Optionally, processing of the incoming data is also contemplated that normalizes it in some desired way (e.g., truncated to a given length, removal of leading ones or zeros, etc.)

At step 52, the data received is tested. For this, a number of possible tests are contemplated that ascertain the amount of entropy or the amount of redundancy in the data. While this can be done in a variety of ways, representative examples include direct calculation of the "self-entropy" or zero-order Shannon entropy; heuristics involving compression of the raw input, such that if compression is possible on the data, the data was not completely random; comparison of a current input of data with a prior input in terms of Kullback-Leibler distance (or the "resistor-average" distance of Johnson and Sinanovi); and so on. Regardless, it is expected that the result of the testing 52 will yield a score 54 typified by a decimal number between 0 and 1: with the former having no entropy characteristics; the latter having full entropy characteristics; and numbers in between being linearly scaled. As an example, a score of 0.9 on a scale of 0 to 1 will be recognized by skilled artisans that 0.9 entropy bits exist per every one supplied input bit.

At step 56, policy is then applied to determine whether the score meets or exceeds a predetermined amount. For example, if an intended purpose of the use of the entropy data was for military cryptography, a government contract might specify that only data meeting or exceeding a 0.9 score be considered for its intended use. Alternatively, if policy dictated only the best data be selected from multiple sources of data, then the data with the highest score would be used. As another example, existing or proposed legislation might require certain business entities to use only data meeting or exceeding a minimum threshold. In such instances, the go/no-go decision of step 56 would be based on a comparison to the law. Representatively, FIPS 140 is contemplated. This might also prove useful in auditing, accounting or indicating compliance for legal or other proceedings. Of course, skilled artisans are able to contemplate other policy decisions for accepting entropy data based on scores.

To the extent the score meets or exceeds the policy at step 56, the data is then used for its intended purpose at step 58. Representative environments having need of entropy data for various purposes include, but are not limited to, cryptography, science and research, security, military, communications and the gaming industry, to name a few. As before, each of these industries at least utilize numbers from RNG, PRNG or CSPRNG for various apparatuses or methodologies. In science and research, statistical distributions are common and raw random data is used for biasing various curves with random noise, for instance. In cryptography, military and communication environments, random numbers are contemplated for synchronizing phones, radios, etc. In gaming, random numbers find repeated usefulness in slot and poker machines. As technologies develop, intended applications will also develop. For instance, as next-generation RFID's are developed, it may be necessary to engage in mutual authentication with other devices, possibly each other. (Imagine your luggage and laptop mutually authenticating to each other and to your wristwatch at an airport. For this, the invention is an enabling technology.) Any scenario involving peer-to-peer serving of entropy, however, is already an immediately applicable intended purpose. On the other hand, if the score does not meet or exceed the policy at step 56, various options are available as indicated by off-page connector A.

Figure 4:
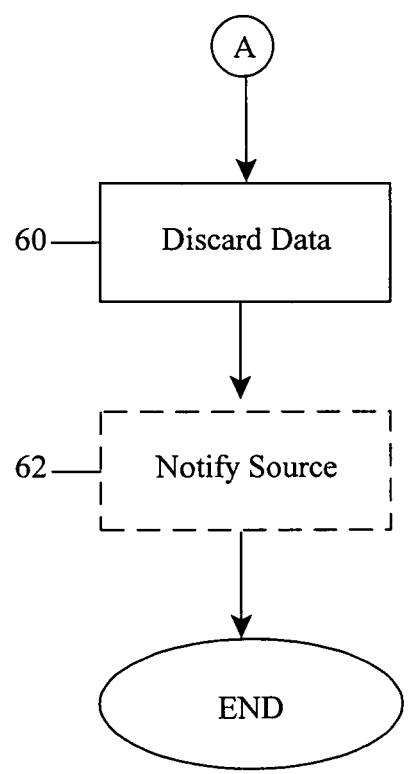
FIG. 4 is a flow chart in accordance with the present invention of a representative first option for use with the flow chart of FIG. 3.

In a first option (FIG. 4), the data recipient simply discards the data and avoids using it, step 60. Optionally (indicated by dashed lines), they also notify the source of the data, step 62, to inform them of a failed test score and/or the discarding. Notification, however, may be undesirable. If third party eavesdroppers are aware of non-use of the data, they have gained insight into an aspect of the recipient's practices. On the other hand, notification keeps communication lines with the data source open and frank.

Figure 5:
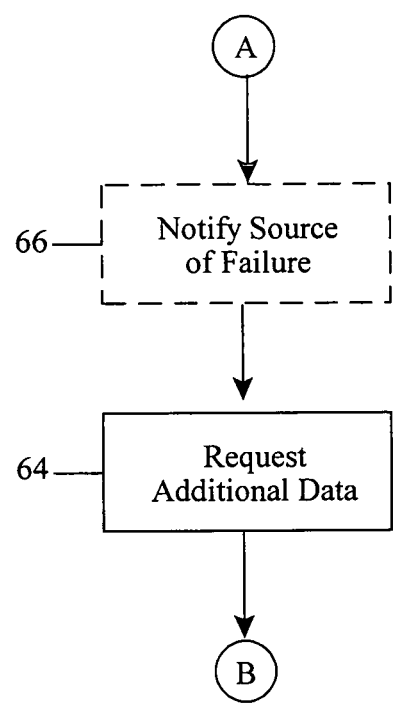
FIG. 5 is a flow chart in accordance with the present invention of a representative second option for use with the flow chart of FIG. 3.

In a second option (FIG. 5), the data recipient requests additional data be provided from the source, step 64. Optionally, they notify the source of a failed test score relative to policy, step 66, and such occurs before, during or after step 64, as the case may be. As before, the advantage of notifying is related to open and frank communications between the parties. The disadvantage is that eavesdroppers have knowledge that the data eventually used is other than the original. This minimizes security.

At some point after the request for additional data is requested (step 64), the source provides another payload of data and the processing of FIG. 3 is repeated, indicated by off-page connector B. Of course, this creates an infinite loop scenario whereby a data recipient continually requests more data that never passes the policy decision. It is expected, however, that the recipient would at some point cease or terminate the loop of their own volition.

Figure 6:
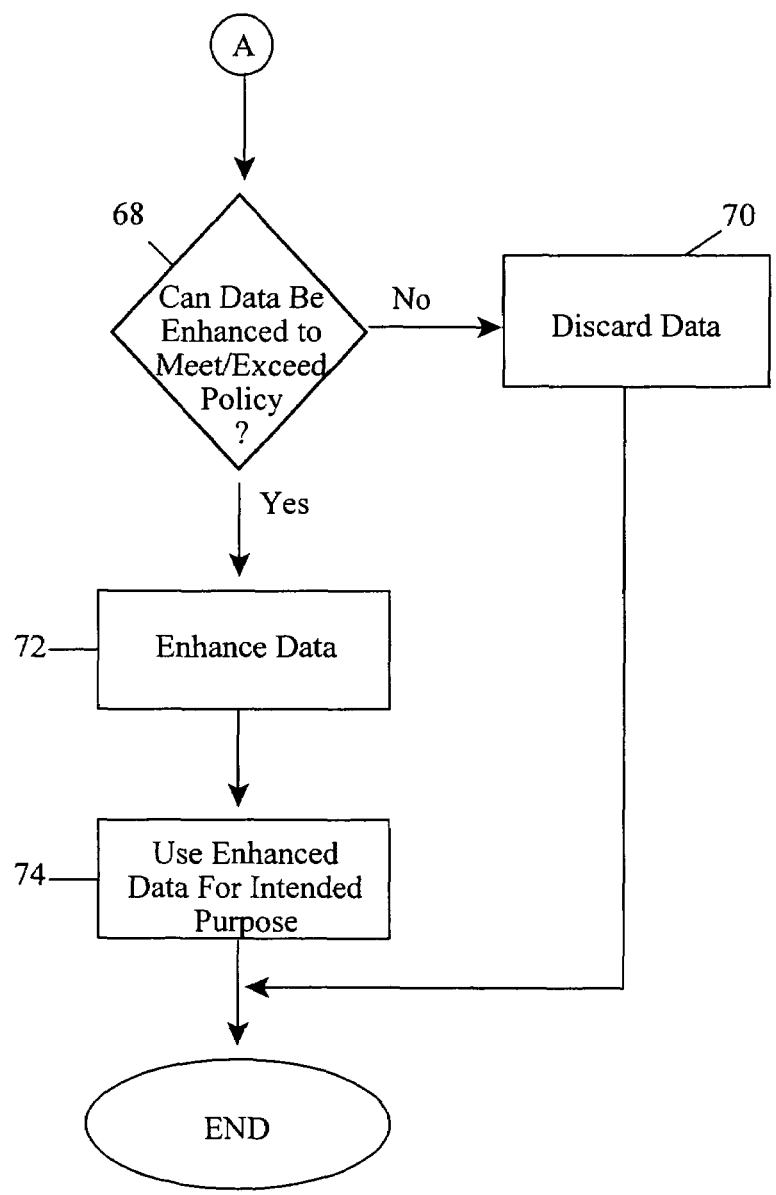
FIG. 6 is a flow chart in accordance with the present invention of a representative third option for use with the flow chart of FIG. 3.

In a third option (FIG. 6), a determination is made, step 68, whether the data of the failed test can be enhanced somehow (representative examples to follow in FIG. 12) to meet or exceed the original policy. Simply stated, if the data cannot be enhanced, it is discarded and not used at step 70. If it can, on the other hand, it is enhanced at step 72 and then used for its intended purpose at step 74.

Figure 7:
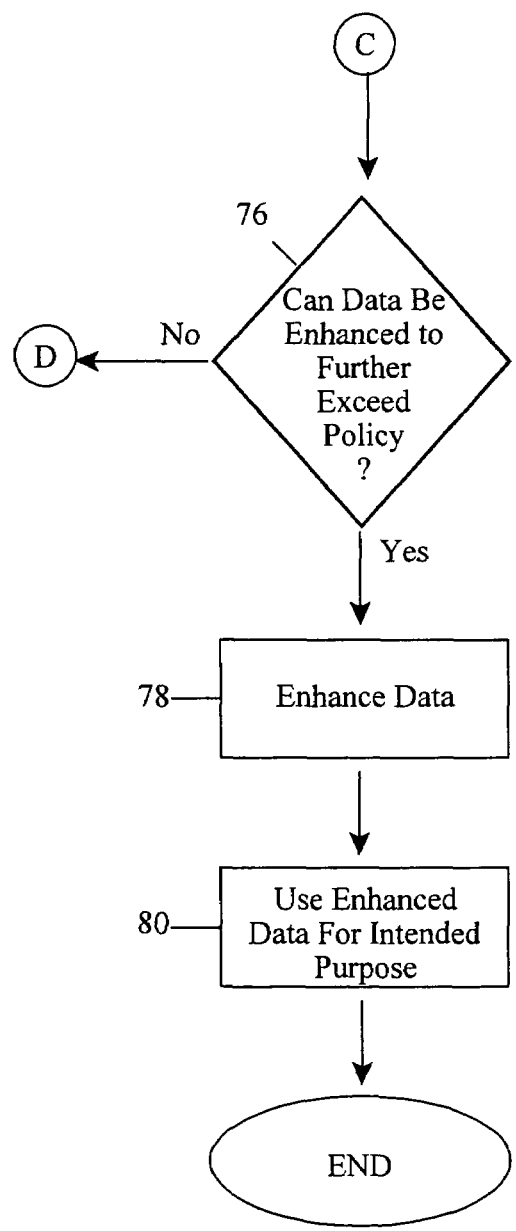
FIG. 7 is a flow chart in accordance with the present invention of a representative fourth option for use with the flow chart of FIG. 3.

Similarly, FIG. 7 shows an optional step, for FIG. 3, beginning with the off-page connector C that determines whether data can be enhanced. The difference between this and FIG. 6, however, lies in that the data under consideration at step 76 has already met or exceeded the original policy and is now being examined to see if it can be further enhanced. One reason for attempting this relates to avoiding or accepting data that barely passes the policy test at step 56. For example, if a policy dictated that only data with a score of 0.8 be used for an intended purpose, if the supplied data actually only received a score of 0.8, the policy is met, but it may be further desirable to do better. To the extent the data can be enhanced to further exceed the policy, it is then enhanced at step 78 and used for its intended purpose at step 80. If it cannot be enhanced, the off-page connector D shows the flow back to step 58 of FIG. 3. Of course, any of the optional embodiments could be mixed and matched with one another to achieve even better or different results.

Figure 8:
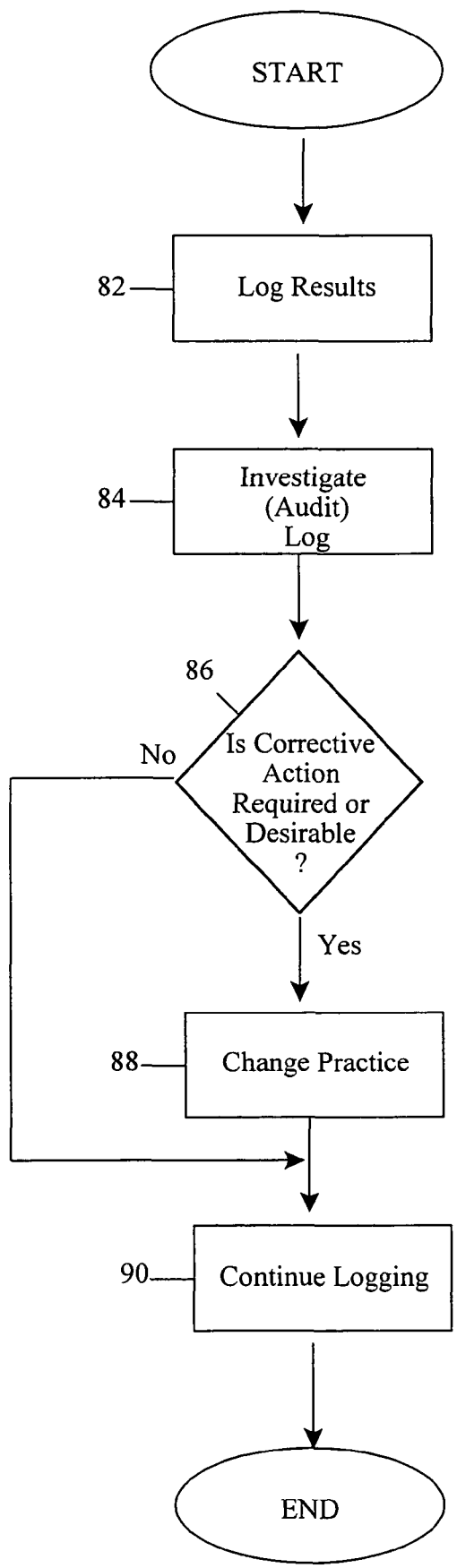
FIG. 8 is a flow chart in accordance with the present invention of a representative logging function aspect of managing supplied data.
Figure 10:
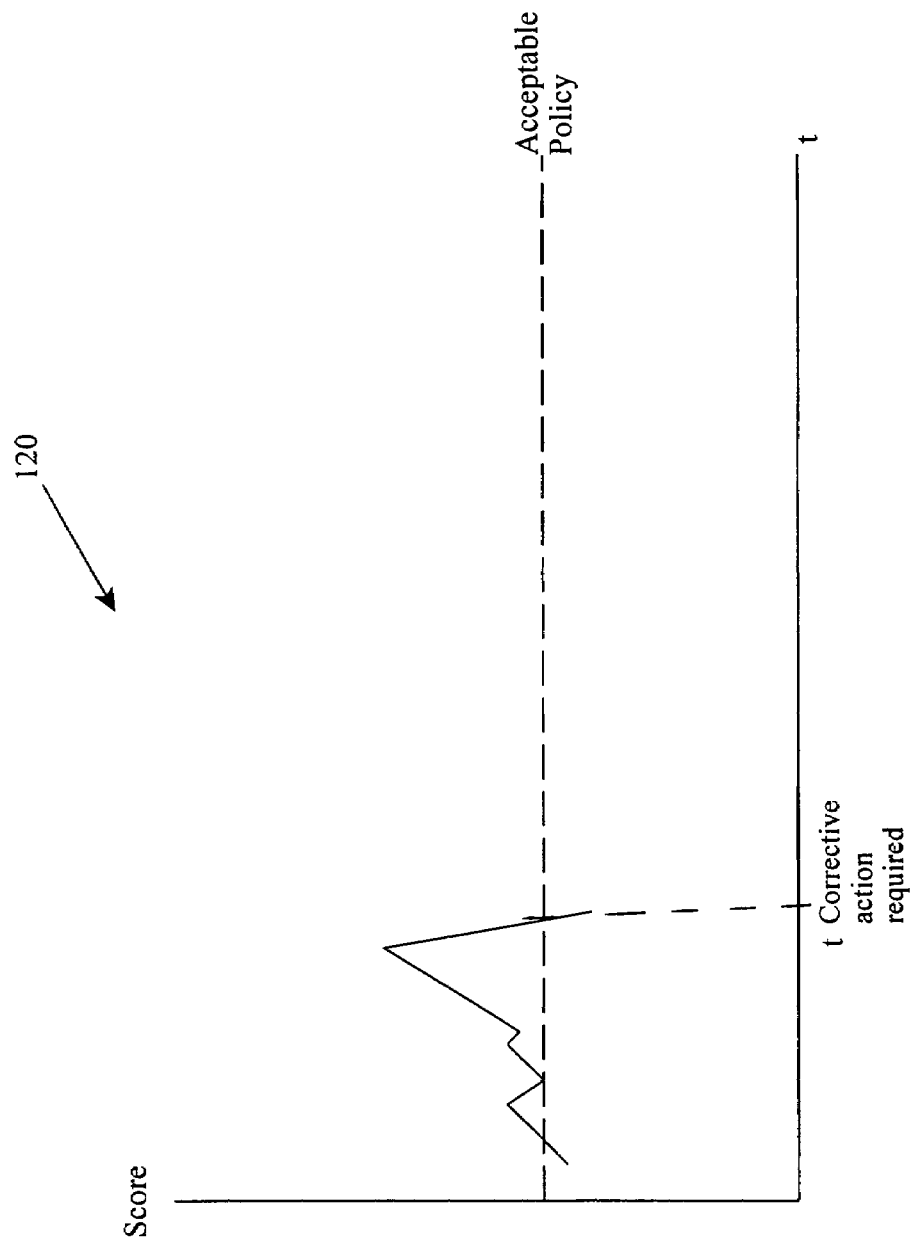

With reference to FIG. 8, a variety of logging functions optionally occur throughout the management of supplied data. Representatively, the recipient creates, maintains, updates, and audits a log for any and all information about the source, and its data, for either historical purposes or determining whether corrective action needs to occur, or both. It should be remembered, aspects of the instant invention relate to developing a certain level of comfort in using entropy data supplied from a data source with an otherwise unknown, uncertain or inconsistent trustworthiness. Thus, logging functions provide timely and/or historical data that can reconstruct the past which is part of the ultimate logic in determining whether the data recipient uses all, some or none of the vended or supplied entropy data. In a representative embodiment, the results of the forgoing process are logged, step 82. The logging is manual, automatic or both and can be computer-implemented as virtual entries. It can exist in hard and soft copies or both. It can exist in a variety of locations including, but not limited to, databases, queues, event busses, mail servers, persistent stores, etc. In FIGS. 9 and 10 (discussed below), representative entries are shown.

At step 84, the log is investigated or audited. It occurs periodically, regularly, rarely, whenever desired, or combinations thereof. It also occurs manually, automatically or both. Upon investigation, if corrective action is required, step 86, a change in practice occurs, step 88. Examples of this include, but are not limited to: selecting one source of data over another because scores have consistently gotten better for the former; eliminating investigating enhancement of the data; eliminating a source from consideration of supplied data for want of passing the policy; etc. At step 90, if the practice is changed or no corrective action is required, continued logging takes place so that further historical records are created and/or determining whether future corrective actions are required.

With reference to FIG. 9, a representative log result is given as 92. Among other things, it includes spreadsheet-style entries 94 for a variety of headings 96. In this regard, contemplated headings include, but are not limited to: the source 98, by name; the source's reputation 100, according to various values described below; the date on which entropy data was supplied; for the entropy data itself, 102, the type supplied 104 (by format), the amount supplied 106 (in bits), the score 108 (0 to 1 from testing), and the scoring techniques used 110 (by name); whether the score met policy 112; whether the data was enhanced 114; the enhancement score 116 (0 to 1, if applicable); and the enhancement technique used 118 (by name, if applicable). As skilled artisans will observe, the log readily yields information regarding whether certain corrective actions are required. For example, if the last ten entries for a data source indicated ten failures of score versus policy, a corrective action of eliminating the data source from consideration could be taken. Alternatively, if one enhancement technique consistently raised 0.8 scores into 0.9 while another technique only raised 0.8 scores to 0.83, an appropriate corrective action might correspond to only using the higher-scoring technique. Still alternatively, if only burst-supplied data represented high-scoring entropy data from a source, an appropriate corrective action might correspond to only having burst-type data supplied. Of course, the possibility of information learned from an audited log is essentially endless and skilled artisans will be able to contemplate other useful scenarios. All, however, are embraced herein.

With reference to FIG. 10, another type of log is given as realtime graph 120. In this instance, scores of entropy data are plotted versus time and as soon as a supplied data drops below a predetermined acceptable minimum, e.g., the set policy, a time for taking corrective action is readily observed. While not shown, other contemplated formats include bar graphs, pie charts, logarithmic graphs, two- and three-dimensional plots, etc.

Figure 11:
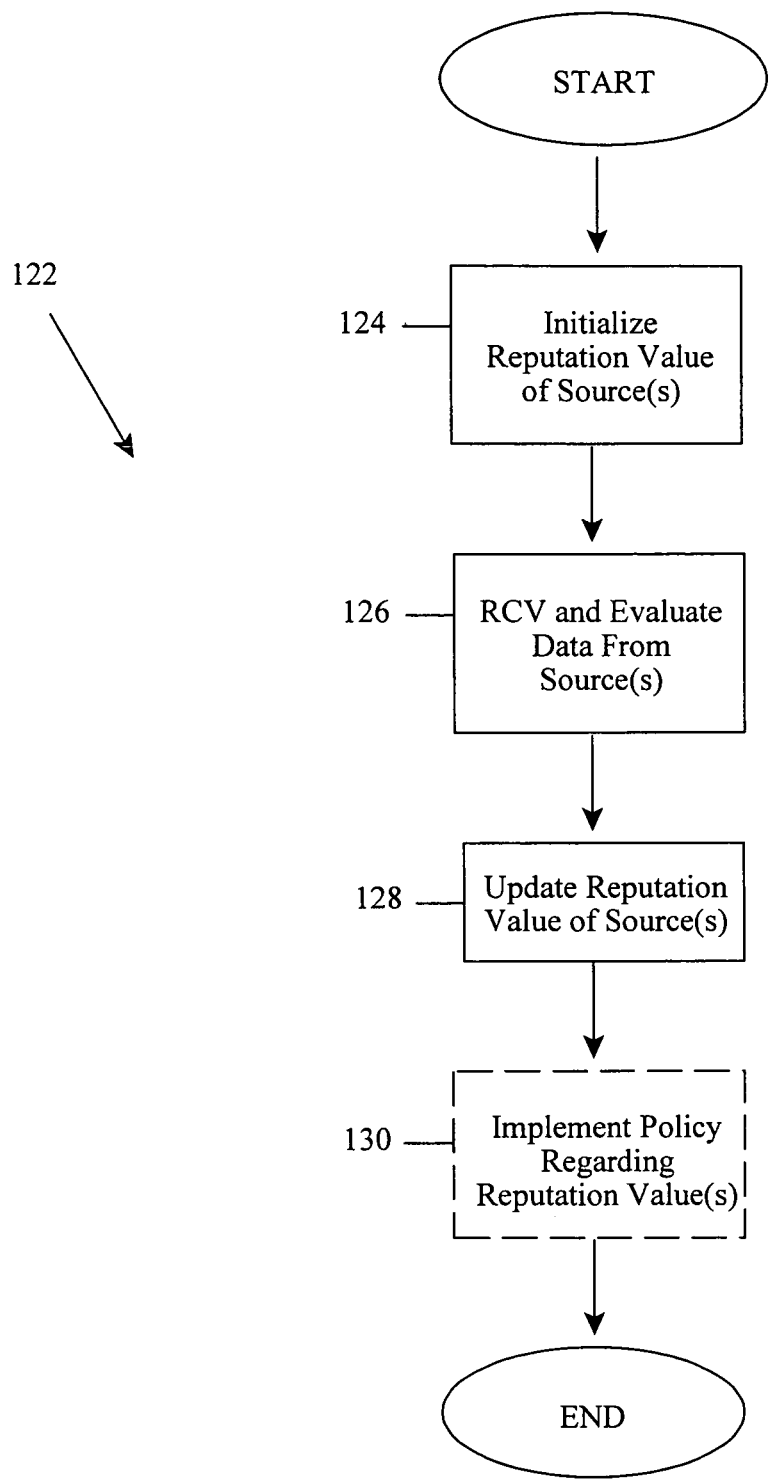
FIG. 11 is a flow chart in accordance with the present invention of a representative reputation function aspect of managing supplied data.

With reference to FIG. 11, a representative reputation function 122 is described. At step 124, a reputation value of a data source is first initialized. That is, whatever information exists about the data source is used to construct an early score of the source. For instance, if the source is a well known corporation with impeccable credentials, perhaps an initial value is made relatively high. On the other hand, if the source is an unknown off-shore entity, perhaps an initial value is made relatively low. Of course, many factors will go into the initialization. Representatively, source size, referrals, charters, location, incorporation, contractual obligations, etc. are some of the readily conceptualized factors. Also, the reputation value itself could be any of a variety of numbers (whole, decimal, negative, imaginary, etc.) or any format suitable for expressing value, such as a grading scale (e.g., A±, B±, C±, D±, F) or a spectrum (e.g., a scale ranging from terrible to excellent). The value can also typify an objective value, a subjective value or a hybrid. It can also be based solely on the source or on a comparative basis to something else, such as to another source, e.g., a spectrum (e.g, ranging from worst to best with all sources identified). Of course, an initial reputation value in the absence of any quantifiable criteria, for example, may be initialized to some neutral starting point, such as zero.

At step 126, entropy data from the source is received and evaluated by the recipient, such as in FIG. 3 et seq., and is based per each receipt of data and/or on an historical trend of all or portions of previous receipts of the data (e.g., earlier payloads). As part and parcel of this, however, the initial reputation value of the data source is contemplated. For instance, if data from a source scored a 0.81 and the acceptable policy score for data was set at >0.8, it may be appropriate, nonetheless, to discard the data from use in its intended purpose in instances when the initial reputation value of the source was set at D−. As another example, if data from a source scored 0.8999 and the acceptable policy score was set at 0.9 or higher, it may be appropriate, nonetheless, to use the data for its intended purpose based upon an initial reputation value set at 99.99% (based on a 0 to 100% scale). Of course, a near endless list of alternatives for this discussion are possible and skilled artisans can readily contemplate the more obvious and obscure examples. All are also embraced herein.

At step 128, depending upon the preceding steps, the reputation value for the data source is then updated. For instance, if an initial value was set at a neutral 0, and the very first payload of supplied data scored a 0.95 (where acceptable policy sets the score at 0.8), it may be the case that the updated reputation value is increased to a value in the neighborhood of 95 (on a scale of 0 to 100 with 100 being the best), or grading it as an A value. Thereafter, whenever another payload of data from the source arrives at the recipient, the updated value is used to evaluate the new data. Intuitively, the higher a source's score, the better its evaluation of data. Conversely, the lower a source's score, the worse its evaluation of data. For at least this reason, step 130 optionally indicates that further implementation of policy is performed thereafter regarding the reputation value. As can be appreciated, receipt of numerous payloads of entropy data from a source will cause numerous instances of reputation values. Altogether, the implementation of future policy can be based on a variety of the numerous reputation values. That is, the future policy may dictate: that only the most previous reputation value be used in evaluating the current payload of data; that all reputation values be averaged together to arrive at the appropriate reputation value for evaluating data; that only recent reputation values be used in evaluating data; etc.

Figure 12:
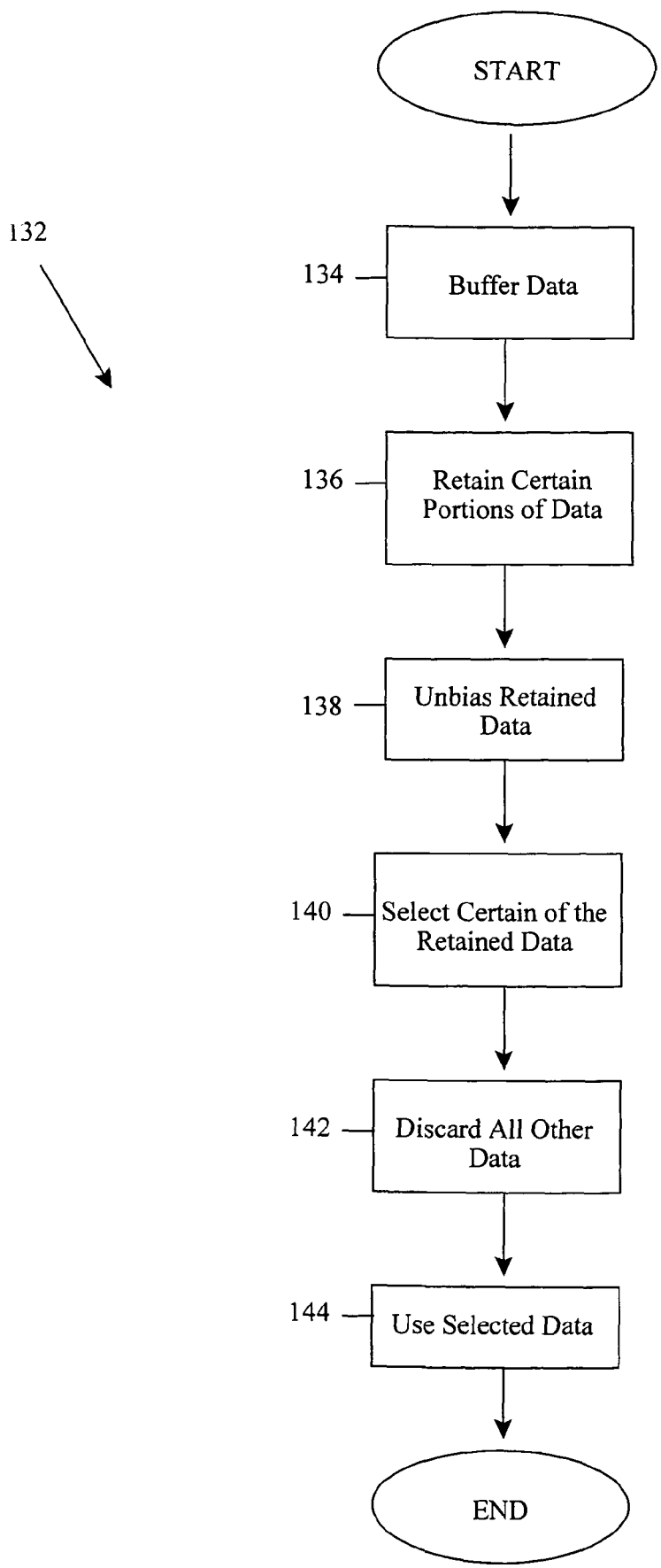
FIG. 12 is a flow chart in accordance with the present invention for representatively enhancing supplied data as part of the management of the supplied data.

With reference to FIG. 12, a representative example of enhancing entropy data that either met or failed a previous instance of policy evaluation, or is enhanced as a matter of policy before being first tested, is given as 132. At step 134, the data is captured by the data recipient in its entropy buffer (e.g., 36, FIG. 2). From there, certain portions of the data are retained, step 136. In this regard, it is decided how many, not which ones, of the entropy data will be retained. For instance, if 100 bits of supposedly random bits were supplied from a data source, and after testing, a score of 0.8 was determined, the number of bits decided to be retained might be set at 80 bits. Also, this step may be based, in part, or not, on an initialized, or current reputation value of the source. For instance, if 80 bits was the determined amount absent any consideration of the reputation value of the source and it was found that the source consistently scored low, (e.g., C− on the aforementioned A±, B±, C±, D±, F grading scale), the retained portion might then be converted to a lower retention of bits from 80 to 60, for example. To provide a margin of conservatism, it may be the case that the amount of to-be-retained bits is purposely always set lower than the scored entropy.

At step 138, the retained data is unbiased to obtain a substantially or exactly equal number of ones and zeros. Preferably, this is accomplished with a Peres unbiasing algorithm, representatively disclosed at the time of filing at http://www-.stat.berkeley.edu/~peres/mine/vn.pdf, or at *Annals of Statistics*, volume 20, Issue 1 (March 1992), 590-597. Alternatively, the unbiasing is performed with an equivalent information-theoretic soundness.

At step 140, certain of the unbiased retained data is selected for use. As compared to step 136, for instance, this amounts to selecting the actual or exact bits, not how many. The selecting may also occur in a variety of manners, including, but not limited to, random selection (especially a CSPRNG-driven process), only those bits compressable thereafter, a first half of the bits, etc. At step 142, all other data is discarded and the selected bits (step 140) are used for their intended purpose, step 144. Optionally, the selected or culled data after step 144 could be used as an input of entropy data for still another data recipient. It should also be appreciated that one or both of steps 140 and 142 represent another instance of being able to implement a policy by the data recipient. For instance, the manner or technique by which the bits are selected (step 140) or dropped/discarded (step 142) (e.g., random, compression, first half, etc.) could be kept as a policy decision of the recipient. To the extent such remains unknown to all others, third parties eavesdropping on the relationship between the data source and data recipient are unable to "backwardly predict" the data which is being used in its intended purpose.

In other words, the eavesdropper gains no information from observing the supplying of entropy data to the receiver from the source and comparing it with keys or other crypto-payloads, from various intended applications, coming out. The supplied entropy data is then of no use to an attacker if the recipient is secretly dropping bits or other amounts of data, especially using a CSPRNG-driven process, for example. Even if the current internal state of the recipient's intended application is known, the use of a CSPRNG in the bit-dropping or discarding step should make it infeasible for an eavesdropper or attacker to predict previous values of the entropy buffer. In theory, a CSPRNG is secure against backward-prediction. If the attacker masquerades as a source, his entropy data will be rejected by the recipient if it is of demonstrably low quality, just the same as it would be for any other source. If on the other hand he injects data of an acceptable quality, he is no longer an attacker but a source and an otherwise untrustworthy source is now able to be used as a source. Among other things, this adds a level of security heretofore unattainable in the art.

Expounding on the optional notion of using the entropy data at step 144 as another source (internal or external to a data recipient) of entropy data, skilled artisans will understand that a grid of sources and recipients could be configured as a network so that they may each receive and transmit arbitrarily amongst each other. They may also consult external PDPs. By configuring certain of the policies, the grid can also be made to behave as a neural network. Feedback paths, weighting of data, rejection criteria, etc, can be controlled entirely in policy, making the entire neural net subject to governance, administration, audit, monitoring, etc. as never before known.

As a result, certain advantages of the invention over the prior art are readily apparent. For example, there is no a priori requirement that a recipient of entropy data trust the provider or source. The provider(s) can also be remote, or local to the recipient. An eavesdropper gains no information as to whether the recipient actually used the data sent by the provider, or in what manner. Based on the recipient's understanding of a particular provider's reputation, the recipient can implement policy around the decision of how much (if any) of the provider's input to use, and in what way(s). Provider reputation can be mapped to a variety of scales. In turn, the reputation value can then be used as an input into policy-based decisions. The technique is adaptive in that the dispositioning of imported entropy can vary in real time as the perceived reputation of the provider changes. Variations in reputation can also be tracked and logged and later audited. In still other words, aspects of the invention teach techniques for ensuring that the entropy extracted from incoming data is cryptographically secure (meets the next-bit test and withstands state-compromise) even when the reputation of the provider is low. Ultimately, it becomes possible for partners who do not trust each other completely, or at all, to participate in entropy exchanges and to authenticate each other.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:
1. A method of managing entropy data, the method comprising:
   receiving, at a computing device, entropy data supplied from an external data source,
   wherein the entropy data comprises random data that is non-deterministic in origin;

scoring, at the computing device, the entropy data to determine whether the entropy data meets or exceeds a predetermined policy score; and developing, at the computing device, a reputation value of the data source based upon the scoring.

2. The method of claim 1, further including:

receiving, at the computing device, subsequent entropy data from the data source; and performing, at the computing device, subsequent scoring of the subsequent entropy data, wherein performing the subsequent scoring involves using the developed reputation value.

3. The method of claim 2, further including updating, at the computing device, the developed reputation value based on the subsequent scoring.

4. The method of claim 1, wherein scoring the entropy data comprises:

testing the entropy data to ascertain an amount of redundancy in the entropy data.

5. The method of claim 4, wherein testing the entropy data comprises calculation of the Shannon entropy of the entropy data.

6. A method of managing entropy data, the method comprising:

receiving, at a computing device, entropy data supplied from an external data source, wherein the entropy data comprises random data that is non-deterministic in origin;

scoring, at the computing device, the entropy data to determine whether the entropy data meets or exceeds a predetermined policy score;

developing, at the computing device, a reputation value of the data source based upon the scoring; and logging, at the computing device, the scoring and the reputation value.

7. The method of claim 6, wherein the entropy data is unpredictable as to content.

8. The method of claim 7, wherein scoring the entropy data comprises determining a number between a first value that represents data having no entropy characteristics and a second value that represents data having full entropy characteristics, wherein numbers between the first and second values are linearly scaled.

9. A method of managing entropy data, the method comprising:

receiving, at a computing device, multiple instances of entropy data supplied from an external data source, wherein the entropy data comprises random data that is non-deterministic in origin;

scoring, at the computing device, the multiple instances of entropy data to determine whether the multiple instances of entropy data meet or exceed a predetermined policy score;

logging, at the computing device, the multiple instances of the scoring;

developing, at the computing device, one or more reputation values of the external data source based upon the logged scoring; and using, at the computing device, the one or more reputation values of the external data source during one or more of the multiple instances of performing the scoring.

10. In a computing system environment, a method of managing data, comprising:

receiving, at a computing device, entropy data supplied from an external data source, wherein the entropy data comprises random data that is non-deterministic in origin;

scoring, at the computing device, the entropy data to determine whether the entropy data meets or exceeds a predetermined policy score;

selecting, at the computing device, only certain of the entropy data for use in an intended application requiring entropy data; and developing, at the computing device, a reputation value of the external data source based on the scoring.

11. The method of claim 10, wherein the selecting further includes unbiasing the entropy data to obtain a substantially equal distribution of one type of data and another type of data.

12. The method of claim 10, wherein the selecting further includes randomly selecting said certain of the entropy data and discarding the unselected of the entropy data.

13. The method of claim 10, further including logging, at the computing device, the scoring.

14. A non-transitory computer-readable medium having computer-executable instructions for managing supplied entropy data in a computing system environment, comprising:

a first component for receiving the supplied entropy data, wherein the entropy data comprises random data that is non-deterministic in origin;

a second component for scoring the supplied entropy data;

a third component for determining whether the supplied entropy data meets or exceeds a predetermined policy score; and a fourth component for utilizing a reputation value of an external data source supplying the entropy data with the second component for the scoring.

15. The computer-readable medium of claim 14, further including a fifth component for enhancing the supplied entropy data to achieve a second score higher than a first score obtained from the second component performing the scoring.

16. The computer-readable medium of claim 14, further including a fifth component for converting the scoring of the second component or the reputation value into a log.

17. The computer-readable medium of claim 14, further including a fifth component known only to a recipient of the entropy data for selecting only certain of the supplied entropy data for use in an intended application requiring entropy data.

18. A method of managing a plurality of random bits of ones and zeros, comprising;

receiving, at a computing device and from an external data source, the plurality of random bits of ones and zeros, wherein the plurality of bits of ones and zeros comprises random data that is non-deterministic in origin;

unbiasing, at the computing device, the supplied plurality of random bits to obtain a substantially equal number of one and zero bits;

randomly selecting, at the computing device, bits of the substantially equal number of one and zero bits;

discarding, at the computing device, all other bits of the substantially equal number of one and zero bits not randomly selected; and determining, at the computing device, a reputation value of the data source.

19. The method of claim 18, further including retaining, at the computing device, a predetermined number of bits from the supplied plurality of random bits.

20. The method of claim 18, further including exclusively performing, at the computing device, the discarding all other bits, wherein the act of the discarding or the amount of the discarding is unbeknownst to all parties other than the computing device.

21. A method of managing entropy data, the method comprising:
- receiving, at a computing device, entropy data supplied from an external data source,
- wherein the entropy data comprises random data that is non-deterministic in origin;
- scoring, at the computing device, the entropy data to determine whether the entropy data meets or exceeds a predetermined policy score;
- developing, at the computing device, a reputation value of the data source based upon the scoring;
- receiving, at the computing device, subsequent entropy data from the data source and performing subsequent scoring of the subsequent entropy data, the performing the subsequent scoring using the developed reputation value;
- for a later intended application requiring entropy data, selecting, at the computing device,
- only certain of the supplied or subsequent entropy data for use in the intended application; and
- discarding, at the computing device, all other entropy data not found in the selected certain of the supplied or subsequent entropy data, the act of the discarding or the amount of the discarding being substantially unbeknownst to all parties other than the computing device.

22. The method of claim 21, further including logging, at the computing device, the scoring, the subsequent scoring, and the reputation value.

23. The method of claim 22, further including auditing, at the computing device, the logged scoring, the subsequent scoring, and the reputation value to determine whether a corrective action is required.

24. The method of claim 23, wherein the selecting only certain of the supplied or subsequent entropy data further includes making a random selection of unbiased entropy data having a substantially equal number of a first and second type of the entropy data.

25. A non-transitory computer-readable medium having computer-executable instructions for performing the steps of:
- receiving, at a computing device, entropy data supplied from an external data source,
- wherein the entropy data comprises random data that is non-deterministic in origin;
- scoring, at the computing device, the entropy data to determine whether the entropy data meets or exceeds a predetermined policy score;
- developing, at the computing device, a reputation value of the data source based upon the scoring;
- receiving, at the computing device, subsequent entropy data from the data source and performing subsequent scoring of the subsequent entropy data, the performing the subsequent scoring using the developed reputation value;
- for a later intended application requiring entropy data, selecting, at the computing device, only certain of the supplied or subsequent entropy data for use in the intended application; and
- discarding, at the computing device, all other entropy data not found in the selected certain of the supplied or subsequent entropy data, the act of the discarding or the amount of the discarding being substantially unbeknownst to all parties other than the computing device.

* * * * *

UNITED STATES PATENT AND TRADEMARK OFFICE
CERTIFICATE OF CORRECTION

PATENT NO.         : 8,606,834 B2                                     Page 1 of 1
APPLICATION NO.    : 11/505134
DATED              : December 10, 2013
INVENTOR(S)        : Kasman E. Thomas et al.

It is certified that error appears in the above-identified patent and that said Letters Patent is hereby corrected as shown below:

In the Claims

Column 12, line 65 (Claim 20, line 3) "discarding or the" should read --discarding or an--.

Column 13, line 23 (Claim 21, line 23) "discarding or the" should read --discarding or an--.

Column 14, line 29 (Claim 25, line 23) "discarding or the" should read --discarding or an--.

Signed and Sealed this
Twenty-sixth Day of August, 2014

Michelle K. Lee
*Deputy Director of the United States Patent and Trademark Office*